United States Patent [19] [11] 3,887,741
Dwyer [45] June 3, 1975

[54] THIN-WALLED HONEYCOMBED SUBSTRATE WITH AXIAL DISCONTINUITIES IN THE PERIPHERY

[75] Inventor: Thomas J. Dwyer, Painted Post, N.Y.

[73] Assignee: Corning Glass Works, Corning, N.Y.

[22] Filed: Aug. 13, 1973

[21] Appl. No.: 387,774

[52] U.S. Cl. ............... 428/188; 23/288 F; 264/177; 428/192; 428/399; 428/398; 252/477 R
[51] Int. Cl. ........ B01j 9/00; B29f 27/00; B32b 3/12
[58] Field of Search ............................... 161/68–69, 161/109, 121, 123; 264/59, 177; 23/288 F; 425/197

[56] References Cited
UNITED STATES PATENTS

| | | | |
|---|---|---|---|
| 3,133,133 | 5/1964 | Fairbanks | 264/59 |
| 3,275,428 | 9/1966 | Siegmund | 65/4 |
| 3,407,110 | 10/1968 | Axelson et al. | 161/68 |
| 3,473,987 | 10/1969 | Sowards | 161/68 X |
| 3,529,693 | 9/1970 | Woodward et al. | 161/68 X |
| 3,692,497 | 9/1972 | Keith et al. | 23/288 F |

Primary Examiner—Philip Dier
Attorney, Agent, or Firm—Richard N. Wardell; Clarence R. Patty, Jr.; Norman L. Norris

[57] ABSTRACT

Ceramic substrate comprising a multiplicity of open-ended cells are provided with a grooved periphery where the grooves extend transversely with respect to the axes of the open-ended cells. These grooves enhance the thermal shock resistance of the structure. When the structure is utilized as a substrate in a catalytic reactor and held in place by flanges blocking the flow of gases through the peripheral cells of the substrate, the grooves extend through the walls of the peripheral cells.

24 Claims, 7 Drawing Figures

THIN-WALLED HONEYCOMBED SUBSTRATE WITH AXIAL DISCONTINUITIES IN THE PERIPHERY

BACKGROUND OF THE INVENTION

This invention relates to honeycombed structures having thin-walled, open-ended cells, and more particularly, to structures of this type comprising ceramic or similar sinterable materials.

Catalytic reactors which are utilized as emission control devices in automobiles may comprise a ceramic substrate having open-ended cells which extend from one end of the substrate to another where the thin walls forming the open-ended cells are coated with a high surface area, active metal oxide impregnated with a catalytically active substance. As hot gases flow through the open-ended cells, reactions are promoted by the catalytically active substance to rid the gases of undesirable pollutants. A honeycombed ceramic substrate in such a device is subjected to considerable thermal shock.

The substrates which are utilized in catalytic reactors of this type may comprise monolithic fabricated structures such as those disclosed in U.S. Pat. No. 3,112,184 — Hollenbach or extruded structures made in accordance with the method described in copending application Ser. No. 196,986, filed Nov. 9, 1971, now Pat. No. 3,790,654. The structure may be formed so as to expose cells at the periphery thereof. However, it is generally considered desirable to provide a skin, sheath or casing around the periphery of the structure since such a structure is more easily handled in manufacturing a catalytic reactor. A skin may also be applied to an extruded or fabricated structure by mechanical assembly or integral bonding therewith. Where the structure is extruded, an integral skin may be formed during extrusion utilizing the method and apparatus disclosed in copending application Ser. No. 239,953, filed Mar. 31, 1972, now U.S. Pat. No. 3,836,302.

As mentioned in the foregoing, structures having peripheral skins are preferred in some instances for handling reasons. Unfortunately, some structures having skins have been found to have undesirably limited thermal resistance.

SUMMARY OF THE INVENTION

It is one object of this invention to provide a thermal shock resistant, sintered honeycombed structure having a plurality of thin-walled, open-ended cells extending from one end of the structure to the other preferably, the cells are of substantially polygonal, straight-sided cross-section.

In accordance with this object, the periphery of the structure includes an axial discontinuity in at least one location between the ends of the structure. The discontinuity may be formed by one or more grooves at the periphery of the structure where the groove extends substantially transversely to the axes of the cells. In one embodiment, at least one groove extends substantially perpendicular to the axes of the cells so as to form a closed configuration circumscribing a section of the structure perpendicular to the axes of the cells. In another embodiment, one or more grooves are inclined with respect to the axes of the cells so as to have a generally helical configuration. In still another embodiment, a multiplicity of grooves are utilized where the length of each groove is less than the distance around the periphery of the structure.

It is another object of the invention to provide a thermal shock resistant honeycombed structure having a skin circumscribing the open-ended cells at the periphery of the structure.

In accordance with this object, the skin at the periphery of the structure is interrupted by the axial discontinuity which may comprise one or more grooves extending substantially transversely to the axes of the cells.

It is still another object of this invention to provide an improved emission control device for an internal combustion engine.

In accordance with this object, a honeycombed structure having a plurality of thin-walled, open-ended cells comprises ceramic materials, a high surface area, active metal oxide and a catalytically active substance so as to form a catalytic reactor. The catalytic reactor is mounted in a support means so as to permit the flow of hot gases through the center of the structure thereby creating a central region heated to substantially uniform high temperatures and a peripheral region which is characterized by substantially lower temperatures. The periphery of the coated substrate includes an axial discontinuity which may be formed by one or more grooves having a depth equal to the thickness of the peripheral region.

DETAILED DESCRIPTION OF A PREFERRED EMBODIMENT

Figure 1:
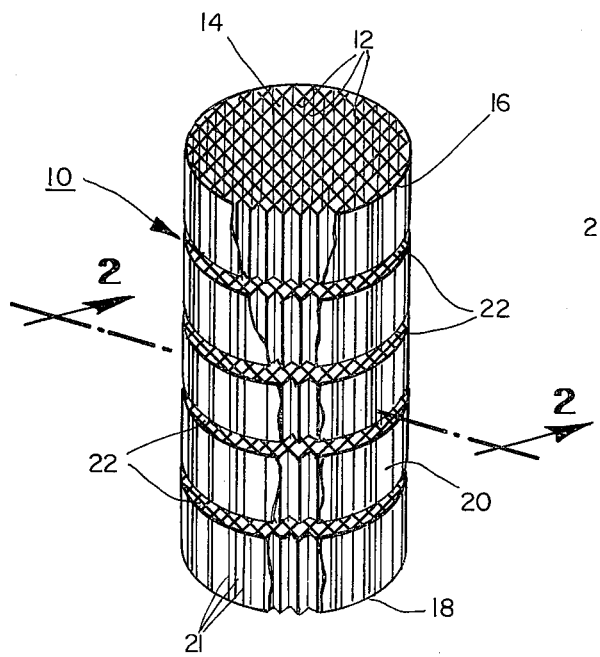
FIG. 1 is a partially broken away, perspective view of a honeycombed structure embodying the invention.

FIG. 1 depicts an extruded monolithic, honeycombed, ceramic structure 10 comprising a multiplicity of open-ended cells 14 having substantially parallel cell axes which extend from one end 16 to the other end 18 of the structure 10. The monolithic structure 10 may be extruded by utilizing the method and apparatus disclosed in the aforesaid copending application Ser. No. 196,986, which is incorporated herein by reference.

The periphery of the structure 10 includes an integral sheath or skin 20 which circumscribes the periphery of the structure 10 and comprises the same ceramic material as the cell walls. The skin 20, which is shown for purposes of illustration as partially broken away in front, may be formed utilizing the method and apparatus described in the aforesaid copending application Ser. No. 239,953, which is incorporated herein by reference. When formed in this manner, the skin 20 may include slight circumferential or peripheral discontinuities indicated by lines 21 which are created by the collapse of the cells forming the skin 20.

Figure 2:
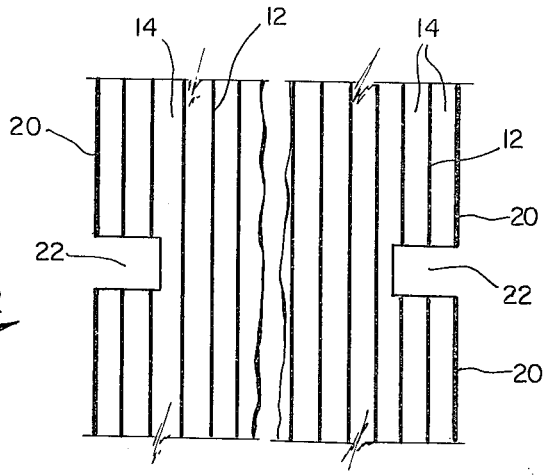
FIG. 2 is a partial section of the structure in FIG. 1 taken at section line 2—2.

In accordance with this invention, the skin 20, which is originally axially continuous, is also made axially discontinuous by providing a plurality of grooves 22 which extend substantially transversely to the axes of the cells 14 so as to have a closed, annular configuration circumscribing a section of the structure. As shown in FIG. 2, the grooves penetrate the skin 20 as well as the layers of cells adjacent the periphery of the structure 10 but do not penetrate the layers of cells at the center. By making the periphery of the structure 10 axially discontinuous while the center remains axially continuous, the structure 10 is extremely resistant to thermal shock of the type encountered when the structure 10 is utilized as a substrate in a catalytic reactor of an emission control device for an automobile internal combustion engine.

The grooves 22 in FIG. 1 and 2 extend completely around the periphery of the structure in this preferred embodiment. However, a segmented axial discontinuity aggregately extending around at least 70% (preferably 90%) of the periphery is considered very effective in increasing the thermal shock resistance of a honeycombed structure.

Figure 3:
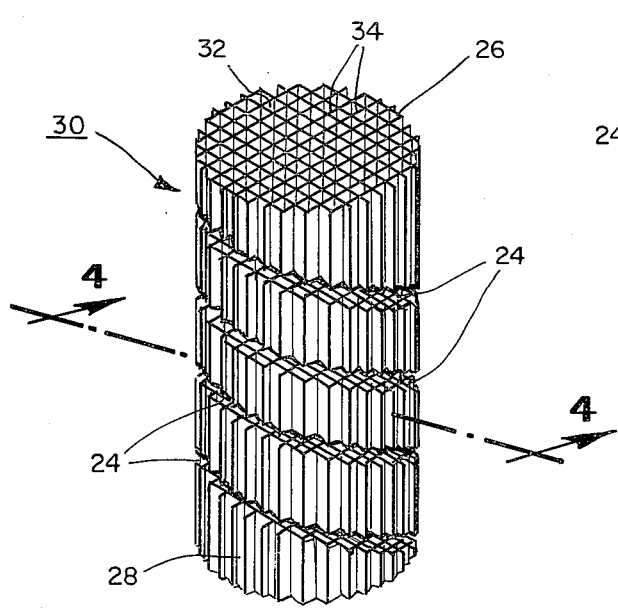
FIG. 3 is a perspective view of another embodiment of the invention.
Figure 4:
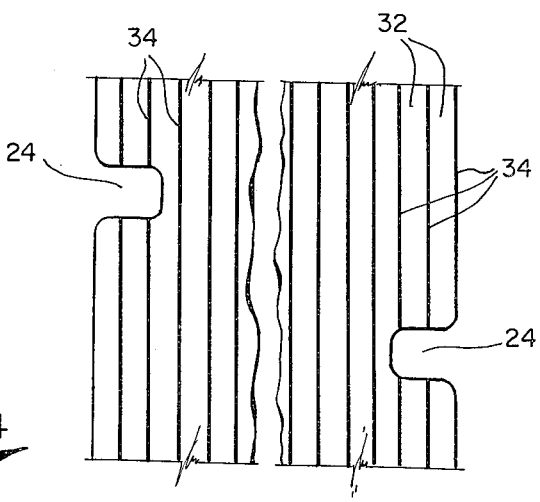
FIG. 4 is a partial section of the structure in FIG. 3 taken at section line 4—4.

In the structure of FIGS. 1 and 2, the grooves 22 extend substantially perpendicular to the axes of the cells 14 so as to form a plurality of annular grooves circumscribing a section of the structure. However, the axial discontinuity of the structure may be formed by grooves which extends transversely to the axes of the cells 14 but are inclined with respect to the axes so as to form a substantially helical groove 24 providing a plurality of axial discontinuities between the ends 26 and 28 as shown in FIG. 3. Note that the ceramic structure 30 is extremely, peripherally discontinuous due to the complete absence of an integral skin or sheath surrounding the peripheral layer of cells. As shown in FIG. 4, the groove 22 extends through the first and second layers of cells 32 and into the third layer of cells. The absence of a skin or sheath on the structure 30 does not render the structure peripherally discontinuous due to the exposed axially extending cell walls 34 of the cells 32 but the structure is, except for the gaps created by the grooves 24, substantially axially continuous at the periphery. Note also the rounded nature of the grooves 24 which are believed, at least in certain circumstances, to enhance resistance to mechanical damage.

Figure 5:
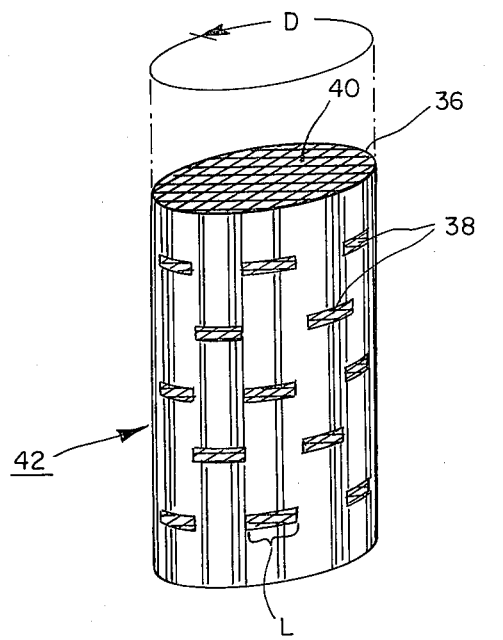
FIG. 5 is a perspective view of another embodiment of the invention.

FIG. 5 illustrates an oval, monolithic, honeycombed structure 42 with an integral skin 36 having a plurality of abbreviated grooves 38 extending substantially transversely through the axes of the open-ended cells 40 and having a length L substantially less than the peripheral distance D around the structure 42. Due to the abbreviated nature of the grooves 38, each of the grooves creates an axial discontinuity in less than the entire periphery of the structure 42. However, the aggregate effect of the abbreviated grooves 38 is to provide axial discontinuities along the entire periphery of the structure 42. As shown in FIG. 5, each groove extends through the skin and the peripheral cell walls. The same beneficial result can also be achieved by shortening the grooves 38 further to in effect provide a plurality of holes where axial discontinuities are provided in at least 70% of the periphery.

Figure 7:
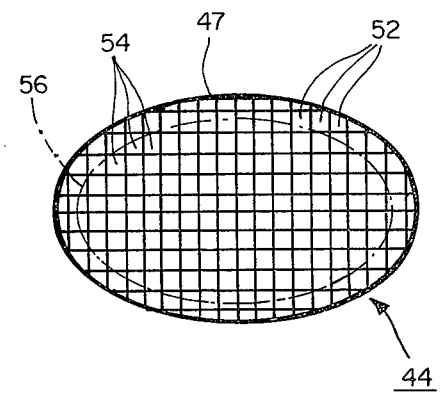
FIG. 7 is an end view of the reactor of FIG. 5 illustrating the hot and cold regions created in the catalytic reactor.
Figure 6:
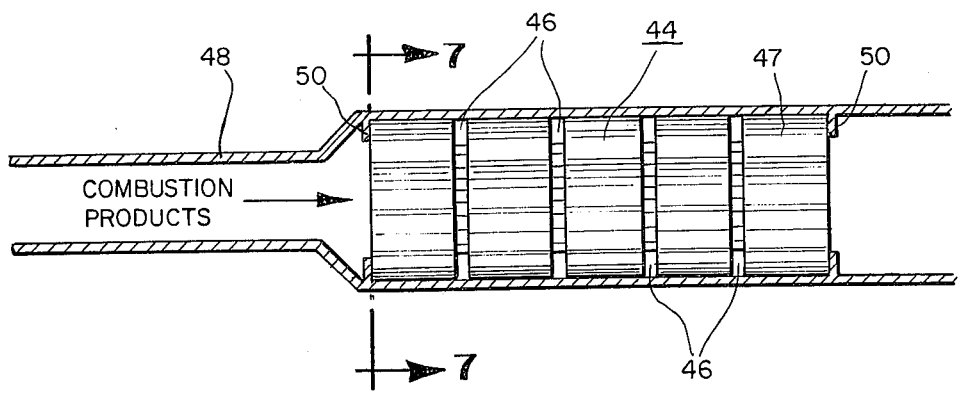
FIG. 6 is a sectional view of a catalytic reactor in an exhaust system where the substrate of the reactor is constructed in accordance with this invention.

FIG. 7 illustrates a honeycombed structure 44 having an oval shape with peripheral grooves 46, as shown in FIG. 6, extending completely around the periphery and through the integral skin 47 thereof. FIG. 6 shows the same structure 44 as a catalytic reactor of an emission control device in an automobile internal combustion enging exhaust system. When utilized in a catalytic reactor of this type, a ceramic substrate may be coated with a high surface area, active metal oxide such as gamma alumina bonded to the substrate by a binder such as silica. Such a substrate is disclosed in copending application Ser. No. 333,642, filed Feb. 2, 1973 (assigned to the assignee of this invention), which is incorporated herein by reference. The coating is then impregnated with a catalytically active substance such as platinum. As an alternative, the structure 44 may be formed from a substrate with a composition including a high surface area, active metal oxide and ceramic materials which are then fired and impregnated with the calalytic substance. As a further alternative, the catalytic substance may be incorporated onto or in the composition of the substrate as it is formed and then coated with a high surface area, active metal oxide or the metal oxide may also be included in the substrate composition.

As shown in FIG. 6, the coated substrate or structure 44 is mounted in an open-ended tubular housing 48 through which the combustion products of an internal combustion engine flow. The structure 44 is held in place by flanges 50 which extend radially inwardly from the walls of the housing 48 adjacent the ends 16 and 18 of the structure 10.

As shown in FIGS. 6 and 7, the flanges 50 serve to block the flow of combustion products through the peripheral cells 52 of the structure 44 which are hidden behind the flanges 50. This creates a relatively cold region at the cells 52 and the skin 47 which remains at a temperature substantially lower than the higher, substantially uniform temperatures of the hot or warm region at the more centrally located cells 54. Preferably, the grooves 46 are of a depth sufficient to extend substantially through the cold region located outside the broken line 56 so as to create gaps in the cells 52 and skin 47 and thereby break-up the axial strain created by the temperature differential between the cold region outside the line 56 and the hot region inside the line 56.

The use of axial discontinuities at the periphery of honeycombed ceramic structures has had the effect of greatly increasing the thermal shock resistance of the ceramic structures. When the structures having a skin or sheath are provided with axial discontinuities in the form of grooves, thermal shock resistance is enhanced to equal or exceed that of skinless honeycombed ceramic structures without axial discontinuities. Moreover, the axial discontinuities also serve to enhance the thermal shock resistance of skinless honeycombed ceramic structures as well as structures having partial skins.

The reason why the axial discontinuities provided by the grooves are effective to increase the thermal shock resistance of honeycombed ceramic substrates and thereby eliminate fractures is not known. In many respects, it is a somewhat puzzling phenomenon since one might expect that any discontinuity might weaken and thus serve as a source of fractures or cracks in the honeycombed structure but this is not the case.

The enhanced thermal shock resistance provided by grooving substrates in a manner similar to that of FIG. 1 is well-demonstrated by the results of thermal shock testing bare substrates as set forth in the following table:

Table 1

Summary of Thermal Shock Testing of Bare Substrates

| Groups of Substrates | | Groove Pattern | | | Peak Temperature °C. | Total Tested | Sample Breakage Total Cycles To Failure | | | |
|---|---|---|---|---|---|---|---|---|---|---|
| | | No. | Depth | Width | | | 150+ | 150 | 100 | 50 |
| No. 1 | Round With Integral Skin 4⅝" D × 3" L | 0 | | | 800°C. | 4 | | | | 4 |
| | | 2 | 1⅜" and 1/16" and ¾" | ⅛" | 1000°C. | 9 | 2 | 1 | 3 | 3 |
| | | 4 | ¾" | 1/16" | 950°C. | 18 | 14 | | 1 | 3 |
| No. 2 | Round With No Skin 4⅝" D × 3" L | 0 | | | 975–1000°C. | 12 | 8 | 1 | 2 | 1 |
| | | 2 | ⅜" and ¾" | 1/16" | 1000°C. | 8 | 7 | 1 | | |
| No. 3 | Round With Integral Skin 4⅝" D × 3" L | 0 | | | 975°C. | 4 | | | 2 | 2 |
| | | 2 | ⅜" | 1/16" | 1000°C. | 8 | 5 | 1 | 1. 1 | |
| | | 2 | | | 1050°C. | 4 | 1 | | 2 | 1 |
| No. 4 | Oval With No Skin 6½" (D₁) × 3½" (D₂) × 3¾" L | 0 | | | 900°C. | 8 | 1 | 1 | 1 | 5 |
| | | 0 | | | 825°C. | 4 | 1 | 1 | 1 | 1 |
| | | 2 | ⅜" and ⅝" | 1/16" | 950°C. | 8 | 4 | 1 | 2 | 1 |
| | | 4 | ⅜" and ⅝" | 1/16" | 950°C. | 8 | 1 | 2 | 2 | 3 |
| | | 2 | ⅜" | 1/16" | 900°C. | 4 | 1 | 1 | 1 | 1 |
| | | 2 | ⅜" | 1/16" | 825°C. | 4 | 4 | | | |

The substrates of Table 1, all of which were cordierite compositions having cell wall thicknesses of 0.010–0.012 inches, 200 cells per square inch, and the indicated diameters D and lengths L, were tested by cycling a thermal shock unit containing bare substrates (no high surface, area, active metal oxide or catalytic substance) mounted in a manner similar to that shown in FIG. 6. The substrates were subjected to thermal cycling by passing the hot gases generated by an air-gas burner through the cells of the substrates. In each cycle, the temperature rose rapidly from 0°C. to 600°–800°C. in less than one minute. The temperature was then raised at a substantially lesser rate to a peak temperature in the range of 800°C.–1100°C. after an additional three to four minutes had elapsed. The temperature was then dropped at a rapid rate to a temperature of less than 400°C. within one additional minute and gradually cooled to 200°C. or less within seven or so more minutes. The cycle was then repeated over and over until the substraae failed by cracking or fracturing or remained intact in excess of 150 cycles (150+) at which time it was removed from the shock unit.

As shown in Table 1, group No. 1 substrates having a coefficient of expansion of 23 × $10^{-7}$/°C. (25°–1000°C.) and having integral skin were provided with various groove patterns. Four substrates of group No. 1 were provided with no grooves and all of these substrates failed within 50 cycles in the thermal shock unit where a peak temperature of 800°C. was attained. When two grooves were utilized on nine of the froup No. 1 substrates and a peak temperature of 100°C. was attained, only three of the nine samples failed within the first 50 cycles of the shock unit while two of the substrates withstood over 150 cycles. Three of the substrates failed within 100 but more than 50 cycles and one failed within 150 but more than 100 cycles.

The groove patterns on the substrates of group No. 1 were varied in depth and width. The nine substrates having two grooves utilized groove depths varying from one-sixteenth of an inch to 1⅜ of an inch where only one of the indicated groove depths was utilized in a single substrate. The 18 substrates which were provided with four grooves had a groove depth of three-fourths of an inch. Although the various groove depths utilized in substrates of group No. 1 did not reveal that one groove depth was superior to another groove depth in so far as enhancing thermal shock resistance was concerned, it is believed that a groove depth extending at least substantially through the cold region of the substrate does optimize the thermal shock resistance. As also noted in Table 1, the groove widths were varied from ⅛ of an inch to one-sixteenth of an inch but such variations in groove width did not seem to affect the thermal shock resistance of the substrates. Actually, it is believed that substantially smaller groove widths would provide equally improved thermal shock resistance.

Substrates of group No. 2 having a coefficient of expansion of 12–15 × $10^{-7}$/°C. (25°–1000°C.) were of the same dimensions as group No. 1 but had no skin. In this group, the grooving of substrates provided a somewhat less dramatic improvement in thermal shock resistance. Only eight of the twelve substrates having no grooves went over 150 cycles without failure while seven of the eight substrates having two grooves went over 150 cycles without failure. This indicates that some benefit is to be derived from grooving even when the substrate had no skin.

Group No. 3 substrates were the same as those of group No. 2 except for having integral skins. They demonstrate the importance of grooving when the substrate is provided with a skin. All four of the substrates which were not provided with grooves failed within 100 cycles with two of the four failing within 50 cycles. In contrast, the eight substrates which were provided with two grooves and cycled at peak temperatures of 1000°C. performed much better with five of the eight having passed the 150 cycle mark without failure. Four grooved substrates which were subjected to cycle peak temperatures of 1050°C. did not fare quite as well although they did fare better than the ungrooved substrates which were subjected to peak cycle temperatures of only 975°C.

The oval substrates of group No. 4 having a coefficient of expansion of 12–15 × $10^{-7}$/°C. (25°–1000°C.) exhibited improved thermal shock resistance when grooved. Without grooves, a total of five of the eight substrates which were subjected to peak cycle temperatures of 900°C. failed within 50 cycles. Those substrates which were grooved and subjected to the same or higher peak cycle temperatures were able to endure, on balance, a greater number of cycles before failure. The four substrates of group No. 4 which were provided with two grooves and subjected to a peak cycle temperature of 825°C. all endured in excess of 150 cycles without failure. In contrast, the same number of ungrooved substrates subjected to the same peak cycle temperature failed at a lesser number of cycles in three instances.

In the substrates of groups No. 1–3, the grooves were equally spaced with respect to one another and the end of the substrate. In the case of group No. 4, the grooves of those substrates having only two grooves were spaced 1⅛ inch from each end. Where four grooves were utilized, the grooves were spaced one-half inch and 1⅛ inch from each end. There is no indication that the equality in spacing or differential spacing had any significant effect on the failure of the substrates.

Grooved and ungrooved substrates coated with a high surface area, active metal oxide impregnated with a catalytic substance as disclosed in the aforesaid copending application Ser. No. 333,642 were subjected to automobile thermal shock tests where the coated substrate is mounted in an exhaust system such as that shown in FIG. 6. In such a test, the temperature at the outlet of the coated substrate reaches 1600°F. within 2–3 minutes due, in part, to the exothermic reaction of the catalyzed substrate. The 1600°F. temperature is maintained at the outlet for 10 minutes. The engine is then allowed to drop in speed to a slow idle, 600 R.P.M., and cold air is added for cooling the outlet to 1200°C. in one minute and to 200°C. in an additional minute. This cycle is repeated every 15 minutes.

The results of tests on the thermal shock resistance of coated substrates which have been subjected to the automobile shock test are summarized in the following table:

The grooved and ungrooved substrates of Table 2 which were all cordierites having integral skins, with wall thicknesses of 0.010–0.012 inches, had the dimensions and shapes noted in the first column. Although the substrates were all cordierites, they were characterized by different coefficients of expansion with the round substrate having the T-shaped cells having the largest coefficient of expansion, $32 \times 10^{-7}$ inches/inch/°C. Where grooves were utilized, the grooves were equally spaced from one another and the ends were one-eighth inch wide and were no more than 3/32 of an inch deep.

Table 2 clearly establishes that grooved substrates perform better than substrates which are not grooved. In the case of round substrates, having a diameter of 4⅝ inches and length of 3 inches with a coefficient of expansion of $23 \times 10^{-7}$ inches/inch/°C., three grooved substrates went at least 131 cycles before failing. In contrast, substrates which were not grooved failed after 40 cycles where the average is based on failures in less than 120 and more than 10 cycles. Thus the substrates which were not grooved failed in fewer cycles than the 131 cycle minimum for the grooved substrate.

A very substantial improvement in thermal shock resistance may be observed for substrates having a coefficient of expansion of $32 \times 10^{-7}$ inches/inch/°C. and having T-shaped cells. Without grooves, three substrates failed after 20, 29 and 36 cycles. On the other hand, when these same substrates were grooved, one substrate went the 300 cycles without failure while the other failed after 113 cycles.

The importance of grooves in long substrates is well demonstrated by the round substrates having a 4⅝ inch diameter and a 6 inch length. When a substrate was not grooved, the substrate failed after 16 and 81 cycles (even though 3 inch lengths of the same substrate went over 300 cycles without failure). When provided with four grooves, the 6 inch long substrate was removed from the test after 225 cycles without failure. Thus, where longer substrates are utilized, grooving becomes very important to increase the thermal shock resis- Table 2

Automobile Engine Thermal Shock Testing

| Substrate | Substrate Expansion ($10^{-7}$ in./in./°C.) | Cycles to Failure | |
|---|---|---|---|
| | | No Grooves | Grooves |
| Round — 4⅝" D × 3" L (square cells) | 23 | 40 Average | 300+ 2 grooves<br>300<br>131 |
| Round — 4⅝" D × 3" L (square cells) | 24 | 161<br>74<br>91 | 300+ 5 grooves<br>300+ |
| Round — 4⅝" D × 3" L (T cells) | 32 | 29<br>36<br>20 | 300+ 2 grooves<br>113 |
| Round — 4⅝" D × 3" L (square holes) | 32 | 7<br>45 | 10 2 grooves |
| Round — 4⅝" D × 6" L (square holes) | 12 | 16<br>81 | 225+ 4 grooves<br>225+ |
| Oval — 6½" D₁ × 3½" D₂ × 3¾" L (square holes) | 15 | 51<br>71<br>52<br>96 | 300+ 2 grooves<br>170<br>59<br>37 | tance. Also, the longer substrates may require more grooves.

The failures of the structures which are referred to in the foregoing are generally characterized by lines or planes of fracture which extend through the structure both generally parallel and generally perpendicular to the axes of the cells. However, Table 2 does not reflect the limited capability of grooves to alleviate those thermal shock fractures generally parallel to cell axes but passing through the structure near or at its center, which mainly occur in structures having a coefficient of thermal expansion less than about $16 \times 10^{-7}/°C$. ($25°–1000°C$.). The data do show that grooving is capable of alleviating thermal shock fractures that occur (in the absence of grooving) parallel to cell axis but pass through the structure generally in the radially outer half or portion thereof and commonly substantially concentric to the periphery.

In the foregoing, particular groove spacings and widths have been suggested. Equivalent groove spacings and widths may be utilized in the structures of FIGS. 3–5. For example, a groove spacing for axially aligned grooves 38 in the structure of FIG. 5 may equal approximately 1 inch. In other words, the distance between one groove 38 and the groove directly above or below that groove as depicted in FIG. 5 would approximate 1 inch. In general, it is believed that the groove depth should be at least 1/32 of an inch.

It will be understood that the honeycombed ceramic structure need not be extruded but may, for example, be fabricated monolithic structures such as Corning Cercor$^R$ structures made in accordance with U.S. Pat. No. 3,112,184. Also, the ceramic structures may be formed without skins or with skins integrally bonded or mechanically assembled. Moreover, the substrate need not be ceramic and need not necessarily be characterized as relatively brittle. Any sinterable material might be utilized. For example, sintered powdered metals might be utilized in the structure. Although a thermal shock induced stress which exceeds the elastic limit of the sintered powdered metal structure may not result in the fractures which would occur in ceramic structures, exceeding the elastic limit could result in permanent deformation of the sintered powdered metal structure even though it is characterized by a fair degree of ductility as compared with a ceramic structure. It is therefore desirable to provide axial discontinuities in such structures in accordance with this invention to avoid such deformation. The same is also true with respect to other relatively ductile sinterable materials such as sinterable organic resin powders.

As pointed out previously, T-shaped holes may be utilized, and in fact are desirable, when the substrate coefficient of expansion is relatively large. The invention is not therefore limited to the use of square-shaped cells shown in the drawings. In this connection, it should be understood that various polygonal, straight-sided shapes may be utilized including rectangles, "bow ties", hexagons and diamonds as disclosed in copending application Ser. No. 346,606, filed Mar. 30, 1973, (assigned to the assignee of this application) which is incorporated herein by reference. Moreover, various cell sizes might be utilized with cell density ranging from 20 or less to 900 or more cells per square inch and with cell wall thicknesses ranging from 0.003 or less to 0.050 or more inches. However, the degree of benefit according to this invention may decrease with higher cell density and/or greater cell wall thickness.

As described in the foregoing, the honeycombed structure may be circular in cross-section or oval in cross-section. It will of course be understood that other structure configurations might be utilized, e.g., a structure square in cross-section.

Although preferred embodiments of the invention have been shown and described and various alternatives and modifications have been suggested, it will be understood that the appended claims are intended to cover all embodiments and modifications which fall within the true spirit and scope of the invention.

What is claimed is:

1. A thermally shock resistant honeycombed structure comprising a plurality of thin walls forming open-ended cells of substantially polygonal, straight-sided cross-section and having axes extending from one end of said structure to the other end, said thin walls of at least 70% of said cells in a layer adjacent the periphery having an axial discontinuity in at least one location between said one end and said other end, said cells located centrally of said layer having substantially axially continuous cell walls.

2. The structure of claim 1 wherein the periphery has a plurality of discrete discontinuities, each of said discontinuities creating an axial discontinuity in less than the entire periphery of the structure.

3. The structure of claim 1 wherein said discontinuity is created by at least one groove extending substantially transversely to the axes of said cells.

4. The structure of claim 3 wherein said groove extends along a line substantially perpendicular to the axes of the cells so as to circumscribe a section of the structure at the periphery.

5. The structure of claim 4 including more than one said groove.

6. The structure of claim 3 including more than one said groove, each said groove creating an axial discontinuity in less than the entire periphery of the structure.

7. The structure of claim 3 wherein said groove is inclined with respect to a line perpendicular to said axes of said cells so as to form a substantially helical groove at said periphery.

8. The structure of claim 1 wherein said structure comprises a ceramic material.

9. The structure of claim 1 wherein said structure is monolithic.

10. The structure of claim 1 wherein said periphery comprises a skin circumscribing said cells adjacent said periphery, said skin and said cell walls comprising substantially the same sintered material.

11. A thermally shock resistant honeycombed structure comprising a plurality of open-ended cells of substantially polygonal, straight-sided cross-section extending through the structure, the periphery of said structure including at least one groove between the end of the structure extending generally transversely to the axes of the cells, all of said cell walls located centrally of said groove being substantially axially continuous.

12. The structure of claim 11 wherein said at least one groove extends around a substantial portion of the periphery.

13. The structure of claim 11 wherein said groove has a substantially uniform depth.

14. The structure of claim 11 wherein said structure is monolithic.

15. The structure of claim 14 wherein said periphery comprises a skin.

16. The structure of claim 15 wherein said groove extends along a line generally perpendicular to the axes of said cells.

17. The structure of claim 16 including more than one said groove.

18. The structure of claim 11 wherein said structure comprises a ceramic material.

19. A thermally shock resistant, sintered honeycombed structure comprising a plurality of thin walls forming open-ended cells having axes extending from one end of said structure to the other end and having a skin at the periphery thereof, said skin and said walls comprising substantially the same sintered material, said skin having an axial discontinuity in at least one location between said one end and said other end so as to provide thermal shock resistance, said skin being axially discontinuous along a substantial portion of the periphery and said cell walls being substantially axially continuous centrally of the periphery.

20. The honeycombed structure of claim 19 wherein said discontinuity aggregately extends around at least 70% of the periphery.

21. The honeycombed structure of claim 19 wherein the axial discontinuity is at least 1/32 of an inch deep.

22. The honeycombed structure of claim 19 wherein the axial discontinuity comprises a groove having a rounded base.

23. The structure of claim 11 wherein said groove has a rounded base.

24. The structure of claim 3 wherein said at least one groove has a rounded base.

* * * * *

UNITED STATES PATENT OFFICE
CERTIFICATE OF CORRECTION

PATENT NO. : 3,887,741
DATED : June 3, 1975
INVENTOR(S) : Thomas J. Dwyer

It is certified that error appears in the above-identified patent and that said Letters Patent are hereby corrected as shown below:

Column 3, line 41, remove "not".

Column 4, line 5, change "enging" to -- engine --.

Column 4, line 30, remove "10" insert -- 44 --.

Column 5, line 45, change "substraae" to -- substrate --.

Column 5, line 55, change "froup" to -- group --.

Columns 5 and 6 - TABLE 1

Group No. 3, line 15, under column Depth, insert -- 3/4" and -- before 3/8".

Group No. 3, line 15, under column 100, change "1.1" to -- 1 --.

Group No. 3, line 15, under column 50, insert -- 1 --.

Group No. 3, line 16, under column Depth, insert -- 3/8" --.

Signed and Sealed this sixteenth Day of March 1976

[SEAL]

Attest:

RUTH C. MASON
Attesting Officer

C. MARSHALL DANN
Commissioner of Patents and Trademarks